United States Patent
Ogilvie

(10) Patent No.: US 8,056,134 B1
(45) Date of Patent: Nov. 8, 2011

(54) MALWARE DETECTION AND IDENTIFICATION VIA MALWARE SPOOFING

(76) Inventor: John W. Ogilvie, Salt Lake City, UT (US)

(*) Notice: Subject to any disclaimer, the term of this patent is extended or adjusted under 35 U.S.C. 154(b) by 1229 days.

(21) Appl. No.: 11/738,487

(22) Filed: Apr. 21, 2007

Related U.S. Application Data

(60) Provisional application No. 60/825,131, filed on Sep. 10, 2006.

(51) Int. Cl.
G06F 11/30 (2006.01)
G06F 11/36 (2006.01)

(52) U.S. Cl. .............. 726/24; 726/22; 726/25; 713/187; 713/188

(58) Field of Classification Search .............. 726/22–24; 713/188
See application file for complete search history.

(56) References Cited

U.S. PATENT DOCUMENTS

| | | | |
|---|---|---|---|
| 6,480,962 B1 | 11/2002 | Touboul | |
| 6,804,780 B1 | 10/2004 | Touboul | |
| 7,010,698 B2 | 3/2006 | Sheymov | |
| 7,065,657 B1 | 6/2006 | Moran | |
| 7,086,090 B1* | 8/2006 | Dawson et al. | 726/24 |
| 7,093,239 B1* | 8/2006 | van der Made | 717/135 |
| 7,484,094 B1* | 1/2009 | Millard et al. | 713/165 |
| 7,640,583 B1* | 12/2009 | Marinescu et al. | 726/22 |
| 2002/0083343 A1 | 6/2002 | Crosbie et al. | |
| 2003/0037138 A1 | 2/2003 | Brown et al. | |
| 2004/0064736 A1 | 4/2004 | Obrecht et al. | |
| 2004/0078592 A1 | 4/2004 | Fagone et al. | |
| 2004/0117478 A1 | 6/2004 | Triulzi et al. | |
| 2004/0128543 A1 | 7/2004 | Blake et al. | |
| 2004/0236874 A1 | 11/2004 | Largman et al. | |
| 2005/0022026 A1 | 1/2005 | Riordan | |
| 2005/0038827 A1 | 2/2005 | Hooks | |
| 2005/0076237 A1 | 4/2005 | Cohen et al. | |
| 2005/0120242 A1 | 6/2005 | Mayer et al. | |
| 2005/0177752 A1 | 8/2005 | Hollander et al. | |
| 2005/0229250 A1 | 10/2005 | Ring et al. | |
| 2005/0257266 A1 | 11/2005 | Cook et al. | |
| 2005/0268112 A1 | 12/2005 | Wang et al. | |
| 2005/0283767 A1 | 12/2005 | Blaku | |
| 2006/0015940 A1 | 1/2006 | Zamir et al. | |
| 2006/0020814 A1 | 1/2006 | Lieblich et al. | |
| 2006/0031940 A1 | 2/2006 | Rozman et al. | |
| 2006/0048225 A1 | 3/2006 | Gomez et al. | |
| 2006/0053492 A1 | 3/2006 | Wallace | |
| 2006/0136720 A1* | 6/2006 | Armstrong et al. | 713/164 |
| 2006/0179433 A1 | 8/2006 | Fair et al. | |

(Continued)

OTHER PUBLICATIONS

Holz et al., Detecting Honeypots and other suspicious environments, Prceedings of the 2005 IEEE Workshops on Information Assurance and Security discloses methods for malware to detect honeypots.*

(Continued)

*Primary Examiner* — Vivek Srivastava
*Assistant Examiner* — Thomas Lauzon
(74) *Attorney, Agent, or Firm* — Ogilvie Law Firm

(57) ABSTRACT

A malware spoof component may be a formed component which has some but not all characteristics of an actual malware file or other component. Alternately, a spoof component may be an isolated component extracted from actual malware. Malware spoof components may be placed on a target system, after which a listing is obtained and checked. If the placed spoof component does not appear in the listing, then the spoof component may have been filtered out by malware infecting the system, thereby revealing the malware's presence.

15 Claims, 2 Drawing Sheets

U.S. PATENT DOCUMENTS

2006/0294592 A1* 12/2006 Polyakov et al. ............... 726/24
2007/0022287 A1* 1/2007 Beck et al. .................... 713/164
2009/0241191 A1* 9/2009 Keromytis et al. ............. 726/23

OTHER PUBLICATIONS

"My Registry has Over 60 errors, up from 29 errors!", groups.google.com/group/microsoft.public.windowsxp.newusers, Apr 24 2003.

"4.1.9 script—record your screen I/O", wks.uts.ohio-state.edu, Aug. 14, 1996.

"TechSmith SCreen Recorder SDK", www.techsmith.com, copyright 1995-2006.

Pages from www.sysinternals.com, portions at least as early as Jul. 9, 1997.

"Wintasks 5 Pro Review, download Wintasks", www.clarkscript.com, no later than Mar. 14, 2006.

"Spyware Defense for SMBs", SearchSMB.com Resource Guide, no later than Mar. 23, 2006.

Pages from paretologic.com, no later than Mar. 14, 2006.

English, "Finding the Right Anti-Spyware Vendor for You", www2.darwinmag.com, Apr. 20, 2005.

"CoolWebSearch", en.wikipedia.org, Mar. 7, 2006.

Google search results "detects spyware by", www.google.com, Mar. 14, 2006.

"Finjan Announces Out-of-the-Box Anti-Spyware Gateway Appliances to Effectively Address the Global Spyware Epidemic", Jul. 18, 2005.

Pages from www.nuker.com/hunterslog, copyright 2002-2006.

"Overview: Understanding Spyware", CounterSpy help file, no later than Mar. 13, 2006.

Landesman, "Spyware Stoppers", PC World magazine, www.pcworld.com, Apr. 2005.

"Windows Defender (Beta 2) helps protect your computer from spyware and other unwanted software", www.microsoft.com, Feb. 13, 2006.

"M$ intellipoint mouse—spyware???", groups.google.com/group/alt.windows98, Dec. 29, 2002.

Brandt, "Poor Defenders", PC World magazine, www.pcworld.com, Dec. 2004.

Pages from www.softwaresecuritysolutions.com, copyright 2005.

"Cisco security agent—an enterprise solution for protection against spyware and adware", www.cisco.com, copyright 1992-2005.

Greenberg, "How to Fix Anti-Spyware", www.informationweek.com, Apr. 12, 2005.

"Spyware Profiling", Tenebril, Inc., www.tenebril.com, copyright 2005.

"Spybot Search and Destroy", "Ad-Aware SE Professional", from www.pcworld.com, no later than Mar. 24, 2006.

"Forensic Discovery", www.porcupine.org, no later than Sep. 10, 2006.

Sherri Sparks and Jamie Butler, "Shadow Walker: Raising the Bar for Windows Rootkit Detection", http://hxdef.org/knowhow/raisingbar.txt, no later than Sep. 10, 2006.

"Detecting Kernel Rootkits", linuxcourse.rutgers.edu, Jul. 15, 2004.

Bryce Cogswell and Mark Russinovich, "RootkitRevealer", www.sysinternals.com/Utilities/RootkitRevealer.html, Feb. 2, 2006.

"Detect a rootkit" postings from Google Group linux.debian.security, Sep. 15, 2001.

"Detect a rootkit" postings from Google Group comp.sys.mac.advocacy, Aug. 23, 2006.

Ryan Naraine, "'Shadow Walker' Pushes Envelope for Stealth Rootkits", www.eweek.com, Jul. 28, 2005.

Wang et al., "Strider Ghostbuster: Why It's a Bad Idea for Stealth Software to Hide Files", Microsoft Technical Report MSR-TR-2004-71, Jul. 24, 2004.

Mark Russinovich, "Sony, Rootkits and Digital Rights Management Gone Too Far", www.sysinternals.com/blog/2005/10/sony-rootkits-and-digital-rights.html, Oct. 31, 2005.

Chris Ries, "Inside Windows Rootkits", www.vigilantminds.com/files/inside_windows_rootkits.pdf, copyright 2006.

John G. Levine, "A Methodology for Detecting and Classifying Rootkit Exploits", Ph.D. Thesis, Georgia Institute of Technology, http://etd.gatech.edu/theses/available/etd-03172004-115855/unrestricted/john_g_levine_200405_phd.pdf, Feb. 2004.

Levine et al., "A Methodology to Characterize Kernel Level Rootkit Exploits that Overwrite the System Call Table", http://users.ece.gatech.edu/~owen/Research/Conference%20Publications/levine_secon04.pdf, 2004.

* cited by examiner

MALWARE DETECTION AND IDENTIFICATION VIA MALWARE SPOOFING

RELATED APPLICATION

The present application claims priority to, and incorporates by reference, U.S. provisional patent application Ser. No. 60/825,131 filed Sep. 10, 2006.

BACKGROUND

Malware includes uninvited software which tries to hide. Examples of malware include rootkits, spyware, Trojans, backdoors, and other software which is designed to be surreptitiously installed and to then avoid detection by users and/or to avoid removal. Malware may also be designed to avoid detection and/or removal by network administrators and other experts. Such experts may be capable of using sophisticated tools and techniques to determine whether malware is present on a system, and if malware is present, to determine which particular malware is present.

Some malware uses filters to hide its components or other indications of its presence on a system. Hidden malware components may include files, registry entries, processes, port assignments, and other objects which are managed with operating system structures and/or other runtime environments. For example, a rootkit might intercept calls to APIs which are used by file system exploration utilities to list the content of file system directories. When a directory listing would otherwise identify files associated with the rootkit, the rootkit intercepts and modifies the listing to remove those entries, so that they are not seen by someone who is using the listing to check the system for malware.

It is known, in connection with a "Black Box, or Dynamic Program Analysis", to create a dummy file for testing, with a file name that is placed by the tester in a data file used by the lrkIV rootkit to store the names of files and directories that are to be hidden. This is discussed in section 3.3 of John G. Levine, "A Methodology for Detecting and Classifying Rootkit Exploits", Ph.D. Thesis, Georgia Institute of Technology, February 2004. The lrkIV rootkit filters from view the specified files, including the dummy file, when the listing command ls is called on the infected system.

Malware can sometimes be detected by searching for signatures of malware executables on disk or in memory, and/or by searching for signs of malware installation, such as kernel interrupt vectors that point outside the normal kernel address space.

It is known to actively infect a system by placing a particular fully functional malware program on the system, in order to test the ability of malware-detection software to detect the malware in question.

It is known to intentionally allow a system to be infected by arbitrary fully functional malware. This may be done, e.g., by connecting an unprotected system to the internet. One may then run malware-detection software to see what malware infections are found on the system.

It is known to create a "honeypot" system, namely, a system which appears to have vulnerabilities and which attracts malware installation and other unauthorized activities, while surreptitiously monitoring them and gathering data which may help identify the locations and/or persons responsible for those unauthorized activities.

The foregoing background was written in hindsight, with the present invention in mind. Thus, the particular cluster of ideas discussed in this background would not necessarily have been obvious to someone who did not have the benefit of familiarity with the invention.

SUMMARY

Some embodiments of the present invention include a method for malware detection and/or identification. A component extracted from a malware infection is placed on a target system, in isolation from at least one other component of the malware infection which is not on the target system. As a result of the isolation, the extracted component is placed without thereby infecting the target system. In some embodiments, a malware spoof component created with some but not all system characteristics of an extracted component is placed, in lieu of or in addition to an extracted component. Regardless, a utility is then used to obtain a listing which, in the absence of filtering by malware, would list the placed malware component. By checking the listing to determine whether the placed malware component is listed, information may be gained about possible infection of the target system by the malware in question. For instance, if the placed component does not show in the listing after being placed on the target system, then the reason may be that the target system was previously infected by the malware, which is attempting to hide itself by hiding a spoof component it treats as part of itself.

Some embodiments, which may be viewed as a malware developer response to the foregoing, include finding on a target system a component which has at least one characteristic that is associated with a particular malware program, and examining the target system in an attempt to determine whether the found component is a malware spoof component. A party placing an extracted component and/or a created spoof component on the target system would know it had done so, whereas a malware program seeking to avoid being spoofed might need to examine the component and perhaps the environment, in order to determine whether the found component is a malware spoof component.

Although many of the examples given herein are methods, the invention also provides other embodiments, such as systems and configured computer-readable storage media, for instance. The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The present invention is defined by the claims, and to the extent this Summary conflicts with the claims, the claims should prevail. Other aspects of the present invention will become more fully apparent through the following description.

DESCRIPTION OF THE DRAWINGS

A more particular description of the invention will be given with reference to the attached drawings. These drawings only illustrate selected aspects of the invention and thus do not fully determine the invention's scope.

DETAILED DESCRIPTION

Context

Figure 1:
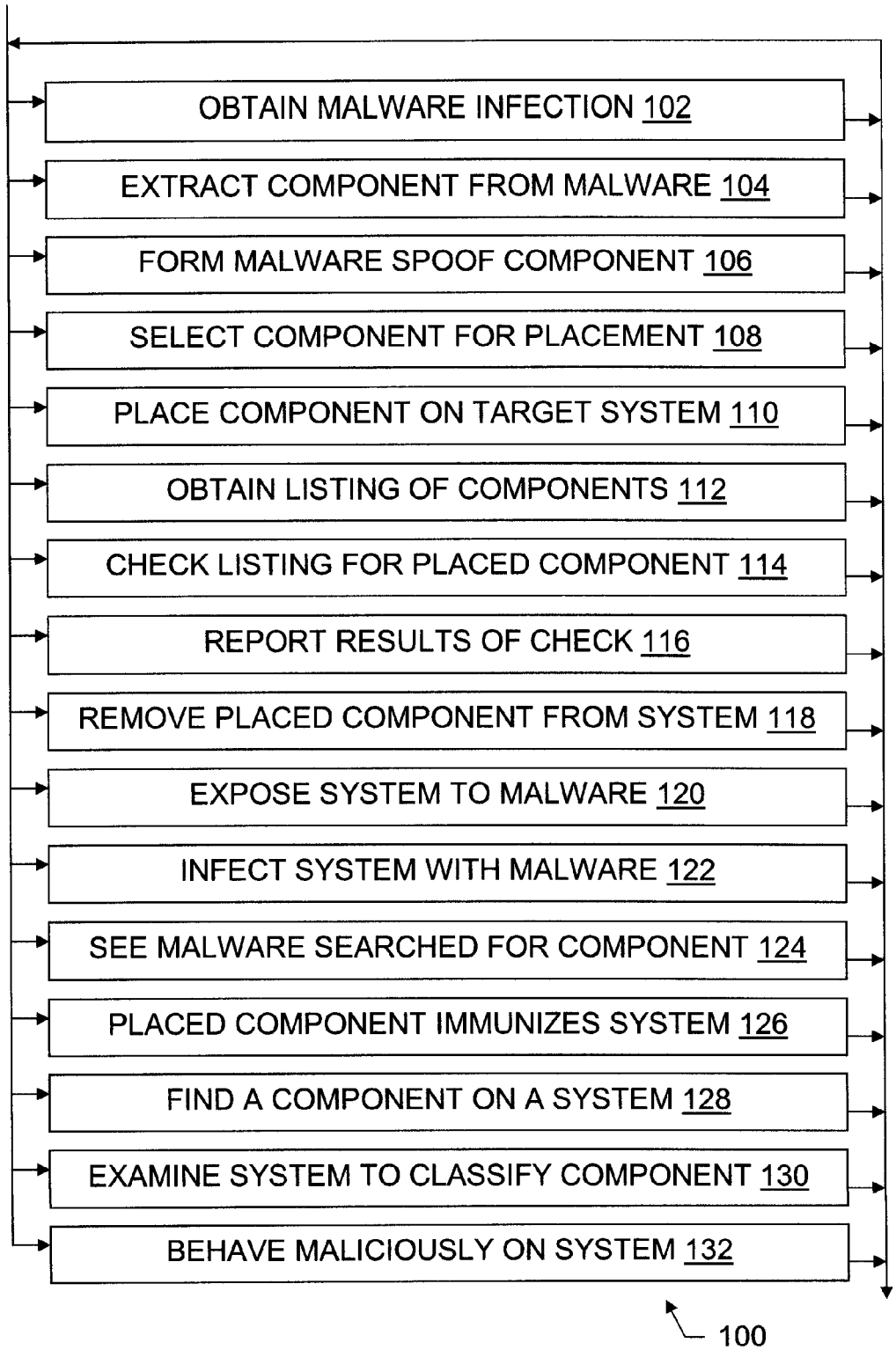
FIG. 1 is a flow chart illustrating steps of some method, configured storage medium, and other embodiments of the present invention.

The present document discusses new tools and techniques for malware detection and identification. This discussion also considers possible responses to those new techniques by malware writers, and then discusses techniques one might use against those responses.

U.S. non-provisional patent application Ser. No. 11/277,453 filed Mar. 24, 2006, titled "Detecting Surreptitious Spyware", by the present inventor, discusses tools and techniques for detecting spyware.

DEFINITIONS

Reference will now be made to exemplary embodiments such as those illustrated in the drawings, and specific language will be used herein to describe the same. But alterations and further modifications of the inventive features illustrated herein, and additional applications of the principles of the invention as illustrated herein, which would occur to one skilled in the relevant art(s) and having possession of this disclosure, should be considered within the scope of the invention.

In describing the invention, the meaning of terms is clarified, so the claims should be read with careful attention to these clarifications. Specific examples are given to illustrate aspects of the invention, but those of skill in the relevant art(s) will understand that other examples may also fall within the meaning of the terms used, and within the scope of one or more claims. Terms do not necessarily have the same meaning here that they have in general usage, in the usage of a particular industry, in a particular dictionary or set of dictionaries, or in the '453 application identified above. Reference numerals may be used with various phrasings, to help show the breadth of a term. The inventor asserts and exercises his right to provide his own lexicography. Terms may be defined, either explicitly or implicitly, here, elsewhere in the Detailed Description, and/or elsewhere in the application file.

Bearing this in mind, to "behave maliciously" includes, without limitation, behavior by software to act without rightful authority when destroying data, gathering passwords, gathering personal information, or surreptitiously installing other software.

To "spoof" a component or a program requires spoofing (replicating or simulating) at least one characteristic of the component or the program. In particular, and without limitation, malware spoofing includes spoofing the presence of a malware program but not its malicious behaviors. The system characteristics of a spoof component that has a corresponding component of a malware infection may accordingly include, for example, file name and file size but not file content; or a signature but not other content; or name and relative position in system data structure list (e.g., registry) but not the same access protections.

A "code isolation mechanism" is a process, task, thread, application domain, DLL or other runtime loadable module, or another system mechanism for distinguishing one piece of code from another during loading and/or execution of the code.

A "timestamp" may be an installation, creation, modification, or other timestamp of a file or other component.

An "apparent source" may be an IP address, another network address, an entry in an author field, or another source indicator associated with a component.

Operating Environment

Figure 2:
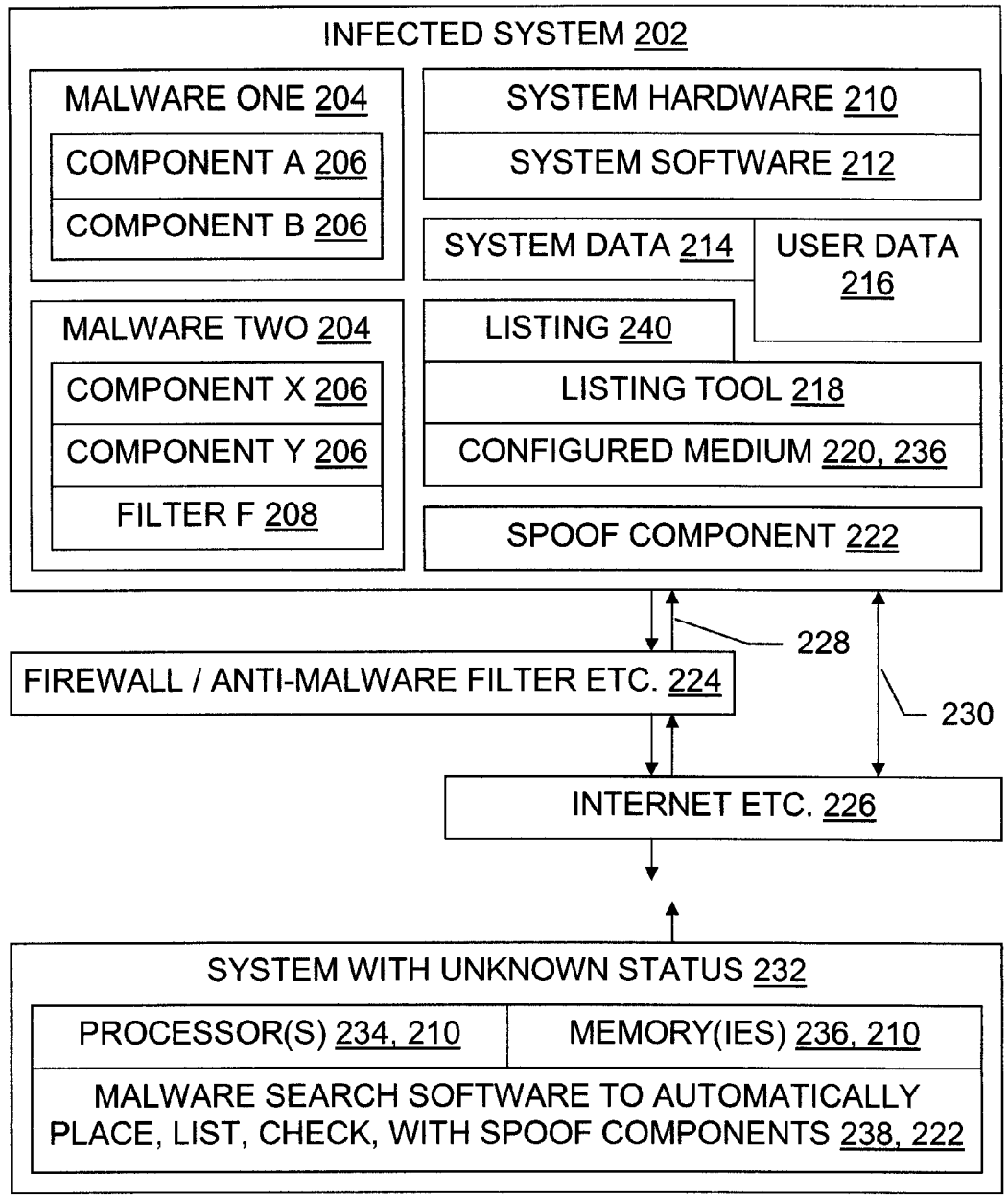
FIG. 2 is a block diagram illustrating some system and other embodiments of the present invention.

With reference to both Figures, an operating environment for an embodiment may include, for instance, a computing device 232 and/or 202, which has hardware 210 such as a processor 234 operable in combination with a memory 236, and which also has software 212 such as an operating system, networking software, and/or other runtime environment. The invention is not necessarily limited to any single operating system, any single type of computing device (PDA, computer workstation, etc.), or any single type of malware 204 (key logger, rootkit, Trojan, etc.). The computing device(s) of a system may be connected 228, 230 to a network 226 (local, wireless, wide area, digital, and/or otherwise), possibly through a firewall 224, or it may be operating as a stand-alone (non-networked) computing device. The infection status of the computing device may be known or unknown, with respect to one or more malware programs respectively, as indicated in FIG. 2 by the presence of systems 202 and 232.

An operating environment and/or an embodiment therein may use or include a single computing device, or may use or include multiple computing devices. For instance, a malware spoof component 222 might be formed 106 in place on a single computing device 202, 232 in some cases, so that forming 106 the spoof component also places 110 the spoof component on the computing device. By contrast, in other cases a spoof component 222 may be formed 106 on one computing device and then later be transferred (by network link, floppy disk, CD, etc.) to another computing device, which is the target system, so that formation 106 and placement 110 occur on different devices.

Interrelation of Methods, Configured Media, and Systems

FIG. 1 illustrates some method embodiments. However, not every step need be included exactly as shown. In a given embodiment zero or more illustrated steps of a method may be repeated, perhaps with different parameters or data to operate on. Steps in an embodiment may also be done in a different order, omitted, combined, or otherwise depart from the illustrated flow, provided that the method performed is operable and conforms with at least one claim.

With reference to both Figures, in a computing system 202, 232 embodiment, disks 210 (magnetic, optical, or otherwise), RAM 236, EEPROMS or other ROMs 236, and/or other configured storage media 220 can be provided. Disks 210 are a form of memory 236. A general-purpose storage medium, which may be removable or not, and which may be volatile or not, is configured with data and instructions 238 to thereby form a configured medium 220 which is capable of causing a device or other system 202, 232 that has a processor 234 to perform method steps disclosed herein. Accordingly, FIG. 1 helps illustrate configured storage media embodiments and system embodiments that perform the methods, as well as illustrating method embodiments.

Overview

In some embodiments, malware detection and identification techniques 100 begin by placing 110 on a system 202, 232 one or more components 222 that spoof corresponding components of a plurality of malware programs 204. For instance, an embodiment may place 110 on a system 202 malware spoof files 222, in the form of files having names used by files of two or three different rootkits 204. Then the contents of directories 214 in which the malware spoof files were placed are listed 112, using a Microsoft Windows Explorer tool 218, a dir or ls command 218, or a similar file listing tool 218 on the system in question. If malware spoof files 222 are missing 114 from the listing 240, that indicates 116 that the corresponding malware 204 is on the system, because that malware filtered 132 out the spoof files to avoid detection.

Alternately, or in addition, an embodiment may place 110 malware-spoofing registry entries 222, malware-spoofing processes 222, and other malware spoofing components 222 on the system, and then check 114 for those spoofing components using standard system utilities 218 that list currently running processes, currently assigned ports, current CPU usage, current registry entries, and the like 214. Malware spoofing components 222 missing from the resulting lists 240 correspond 114, 116 to malware filters 208 operating 132 on the system.

If all malware spoofing components 222 thus placed 110 appear 114 in the listings 240, then one of two conditions likely holds: (a) none of the malware 204 being tested for is present on the system, or else (b) malware 204 is present but it is of a more advanced design in that it can distinguish 130 between its own components 206 and spoof components 222, and after making that distinction it 204 lets listings 240 include spoof components while still hiding its own components by preventing their appearance in the listings 240.

That is, malware designers may respond to the malware detection techniques just described (e.g., placing 110 spoof components 222 to see if they get filtered 208) by making malware 204 that distinguishes 130 between (a) malware components 206 that the malware designer wants on a system 202, and (b) spoof components 222 that the malware designer did not intend to be on the system.

In effect, an embodiment may thus help enroll malware designers in an effort to develop techniques for distinguishing 130 malware 204 from other software, including techniques for authenticating software and for protecting its integrity. Malware designers will want to authenticate their software 204, and the techniques they use to do that may be adapted for use in authenticating software 212 that is legitimately present on a system. To the extent that malware designers include signatures and/or other specific characteristics in their malware 204 to avoid being spoofed, those characteristics (once identified by anti-malware developers) can also be used by malware detection tools to detect and identify 130 malware 204.

The steps taken by malware designers to distinguish malware components 206 from spoof components 222 may vary according to the extent and nature of the spoofing. For instance, if a spoof malware file 222 simply has the same name and apparent source as an actual malware file 206 but lacks other characteristics of the malware file, then the malware filter 208 may be designed to look not only at file names and sources but also at file sizes. Purported malware files with the malware component 206 name and apparent source but not having the same size as the malware component 206 (or one of several expected sizes, or size range(s)) will be sent through the filter 208, while files with the malware component name, apparent source, and component size will be hidden 132 by the filter 208. Similarly, other file characteristics such as creation date, a signature or hash of the content, or a keycode embedded in the file at a specified location, might be used by malware filters 208 to distinguish malware spoof files 222 (pass them through the filter) from actual malware files 206 (hide them with the filter).

Possible malware components that have at least one corresponding operating system data structure 214 in a linked list, tree, array or other arrangement, in memory and/or on disk, may also be checked 130 as to their relative or absolute position in that data structure 214. Spoof components 222 might be identical in every other checked 130 characteristic but still be in the wrong position in the data structure 214, and thus be distinguishable from actual malware components 206 in that manner. Possible malware components may also be digitally signed, using techniques developed to protect against malware, for instance, to distinguish 130 the actual malware components 206 from spoof malware components 222.

In short, malware designers may respond to new malware detection techniques by employing malware authentication techniques to distinguish actual malware 206 from spoof malware 222. Anti-malware designers can then respond by using those techniques to identify malware—if a malware designer uses a technique to distinguish malware from other software, then that same technique or a variation of it can also be used by anti-malware designers to distinguish malware from other software, although the motives differ in each case (facilitate malware versus combat malware).

Anti-malware designers might also respond by increasing the verisimilitude of the malware spoof components 222, by at least enough to have malware filters 208 treat the spoof components as if they were actually malware, e.g., to hide them from view in listings 240. At one end of a spectrum of verisimilitude, a spoof component 222 may have only a single characteristic in common with an actual malware component 206, e.g., a process name. At the other end of the verisimilitude spectrum, the spoof component 222 may be an isolated copy of an actual malware component 206. Examples of isolated components 206 serving as spoof components 222 might include a registry entry with no corresponding executable code, a process with the same name as its malware counterpart but harmless dummy code, and so on.

Many malware components 206 operate 132 fully (if at all), only in conjunction with other malware components 206. Thus, placing an isolated malware component 206 on a system 202, 232 does not necessarily place functional malware on a system not previously infected by the malware 204. If the malware 204 is already present, then placing part of it on the infected system 202 again likely does little or no additional harm.

In short, one or more isolated components 206 of a malware program 204, which components do not themselves 206 provide fully functioning malware 204, may be placed 110 on a system as malware spoof components 222 in some embodiments. Such isolated malware components will be likely to have the size, position, signature, and other characteristics needed to be treated by the malware's filter(s) 208 as actual malware, and thus will likely be filtered 132 from view 240. If they are filtered after being placed 110 by the malware detection effort 100, then that indicates the malware 204 is present on the system. By using the correspondence between particular malware components 206/spoof components 222 and the malware programs that employ those malware components 206, one may also identify 116 which malware is present.

EXAMPLES

Some embodiments obtain 102 a malware infection 204. This may be done using specimens 204 from a lab or test environment. It may also be done by exposing 120 an unprotected system directly 230 to a likely source of malware, such as the internet 226 or a network peer 226 which is known to be infected.

Some embodiments extract 104 a component 206 from malware 204. This may be done by bitwise copying a file 206, possibly with its hierarchical context such as directory names and permissions. It may be done by copying a registry entry 206 and its hierarchical context. More generally, may extraction 104 be done by bitwise copying a section of RAM, disk, and/or other memory 236 that contains the component 206, without copying the entire malware program 204 to which the component 206 belongs. The copied and isolated component 206 can serve in some embodiments as a spoof component 222.

Some embodiments form 106 a spoof component 222 from scratch or by modifying a copied component 206, rather than simply copying an existing component 206. For instance, system data 214 may be created or altered to match some but not all characteristics of an actual component 206. Spoofing may be safer than using an extracted component if the isolation (and hence harmlessness) of the component 206 is unclear. Command line interfaces, system calls, diagnostic utilities, bitwise manipulation tools, sector viewing tools, and other tools 212 familiar to those who work directly with registry entries, process IDs, file signatures, and the like, may be used to help form spoof components 222. Knowledge of the actual component's characteristics can be gained by examining the actual component 206 that is being spoofed. Even if the actual component is difficult to examine or unavailable, some experimentation with different mixes of spoofed and non-spoofed characteristics may help determine which characteristics are tested by a malware filter 208. In some cases, disassembly or debugger-aided examination of the filter 208 may be possible to help determine which characteristics should be spoofed.

Some embodiments select 108 a component 222 for placement 110 on a system. Selection may choose between (a) extracted and isolated actual components 206, and (b) formed 106 components, for example, based on factors such as the availability of isolated components 206, the degree of risk that is acceptable if isolation is unclear, and the availability of information about filter 208 behavior to guide formation 106. Selection may choose between spoof components 222 that correspond with different malware programs 204, based on factors such as whether a given program 204 appears to have infected the system, whether one program 204 is known or suspected of malicious behavior 132 that poses a greater risk to the data 214, 216 than another program 204, and the likely ease with which a given program 204 can be removed if it is present. These and other decision criteria may be presented by an embodiment 238 to a human user, or built-in or previously-supplied criteria may be automatically used by an embodiment 238 to make 108 a selection of which spoof component or components 222 should be placed 110 on a system in a particular situation.

Some embodiments place 110 one or more malware spoof components 222 on a target system 202 and/or 232. Placing 110 a file 222 may be done using standard file creation/copying tools. Placing 110 a registry entry 222 may be done with standard registry editing tools. Placing 110 a process descriptor 222 or other runtime system data structure 214 may be done with system calls 212, low-level memory I/O 212, or the like. Standard program installation tools may also be helpful. Placement 110 is not intended to infect the target system, that is, it is not meant to install a new fully functional 132 instance of the malware 204 whose component(s) 206 correspond to the placed 110 component(s) 222.

Some embodiments obtain 112 a listing 240 after placing 110 a spoof component 222, and then check 114 the listing 240 to determine whether the placed component 222 appears in the listing 240. Directory listing tools 218 may be used to obtain listings 240 for file components 222. Process or task manager tools 218 may be used to obtain listings 240 for process or task descriptor components 222. Registry editors 218 may be used to obtain listings 240 for registry entry components 222. Steps such as placing 110, listing 112, and checking 114 may be automated 238, using scripts, executable code, or other program controls.

Some embodiments report 116 results of the check 114, by writing to a log file and/or displaying results interactively to a human user, for example. Some automated embodiments 238 report 116 results by tracking them internally and using them on occasion as criteria for further selection 108, placement 110, listing 112, and checking 114 steps. If the malware detection software 238 notes (by reporting 116 to itself) that malware spoof component A 222 corresponding to malware component A 206 of malware program one 204 is filtered 208 from the listing 240 after being placed 110, for example, then the software 238 may automatically move on to the next suspect malware program 204 in its target set to check for the presence of that next suspect 204. If the malware detection software 238 notes by reporting 116 to itself that malware spoof component A 222 was not filtered 208 from the listing 240, then the software 238 may automatically try a different spoof component 222 corresponding to malware component B 206, for example, or the malware detection software 238 may presume that malware program one 204 is not present on the system 232.

Some embodiments remove 118 the placed 110 malware spoof components 222 from the target system 202 and/or 232 after checking 114 the listing 240 to see whether they were filtered 208. Removal 118 of a file 222 may be done using standard file deletion tools. Removal 118 of a registry entry 222 may be done with standard registry editing tools. Removal 118 of a process descriptor 222 or other runtime system data structure 214 may be done with system calls 212, low-level memory I/O 212, or the like. Standard program de-installation tools, and/or rebooting, may also be helpful.

Other embodiments do not remove every placed 110 malware spoof component, including some embodiments which leave in place isolated malware components 206 that were placed 110 as spoof components 222. Leaving a placed 110 malware spoof component instead of removing it may help immunize 126 the system against malware 204 which checks new systems to see if it is already installed and does not install itself if it determines (rightly or not) that it has already infected the target system in question.

Some embodiments expose 120 a system to malware 204 sources, such as the internet 226 or a locally networked system known to be infected. Exposure 120 may involve removing or disabling firewalls 224, anti-virus software 224, anti-spyware software 224, and/or other anti-malware software 224, or it may involve bypassing 230 such protections. Exposure 120 may be done in order to test the immunization effect (if any) of a spoof component 222 placed 110 on the exposed target system, for example. Exposure 120 may also be done 120 to obtain specimens of malware 204 for uses such as component extraction 104 or examination to obtain characteristics such as dates, sizes, names, signatures, apparent sources, and the like to be replicated in part in spoof components 222.

Some exposures 120 will result in infection 122 of the system by some malware program 204, although which malware program(s) 204 install themselves may be difficult to predict or control. Accordingly, some embodiments actively infect 122 a target system with a specifically chosen malware program 204. This may be done by downloading a specific piece of infected shareware 204 (e.g., a free screensaver that carries spyware), for example, or by exposing 120 the target system to a network peer known to be infected only by the selected malware 204

Some embodiments monitor 124 the activity of malware 204 with respect to malware spoof components 222. This may be done by using and/or adapting system tools 212 for tracking file activity, process activity, memory I/O, and the like. Examples of system data 214 monitoring tools include tools discussed at www dot sysinternals dot com by Mark Russinovich. Debugger breakpoints may also be helpful for monitoring malware 204 activity. It may also be possible to inject tracking code such as memory writes, checkpoints, or printf( ) calls, into filters 208. Malware 204 may also leave a trail indicating its activities, e.g., modifications to system data 214. In particular, some embodiments monitor 124 malware 204 to determine whether it has searched a system for spoof components 222 and/or searched for their corresponding malware components 206 (that is, for the components 206 that the spoof components 222 spoof). Such searches may indicate, for example, that the malware 204 in question checks new systems to see 128 if an instance of the malware 204 is already installed, and/or that the malware 204 has been designed to find 128 spoof components 222 and to attempt to distinguish 130 spoof components 222 from actual non-isolated malware components 206.

Any or all steps of the methods illustrated in FIG. 1 can be reordered, repeated, omitted, supplemented, grouped differently, and/or named differently, except to the extent that doing so contradicts the claims or makes the method inoperative.

Bearing this in mind, it will be understood that some embodiments include placing 110 on a system a component 206, 222 extracted 104 from a malware infection 204, without thereby infecting 122 the system, in that the placed component does not behave maliciously 132 in isolation from at least one other component 206 of the malware infection which is not on the system. Malicious behavior 132 might include, for example, key logging, user data 216 destruction, silent installation without user consent of other software, and/or other behavior to which the user did not consent and which places the effectiveness, privacy, or integrity of the user data 216 at increased risk. These embodiments also include using a utility 218 to obtain 112 a listing 240 which, in the absence of filtering 208 by malware 204, would list the placed malware component 206, 222. They also include checking 114 the listing 240 to determine whether the placed malware component 206, 222 is listed therein.

In some embodiments, placing 110 the malware component 222 includes placing at least one of the following: a file, a registry entry, a data structure containing a code isolation mechanism identifier, a data structure containing a malware signature.

Some embodiments include exposing 120 the system to a malware program 204, and the placed 110 malware component 222 serves 126 to immunize the system from infection by the malware program 204.

Some embodiments include exposing 120 the system to a malware program 204, and determining 124 that the malware program 204 searches for the placed malware component 222.

Some embodiments include a computer-readable storage medium 220 configured with data and instructions 238 for performing the following method: (a) automatically placing 110 on a system a malware spoof component 222, without thereby infecting the system with malware that is spoofed by that malware spoof component; (b) automatically using a utility to obtain 112 a listing which, in the absence of filtering by malware, would list that placed malware spoof component; (c) automatically checking 114 the listing to determine whether that placed malware spoof component is listed therein; and (d) automatically repeating steps (a) through (c) with at least one other malware spoof component, whereby the method automatically checks the system for malware using a plurality of malware spoof components. In this context, "automatically" means without requiring human interaction or intervention during a given instance of steps (a) through (c). In some embodiments (configured medium or otherwise), the placed malware spoof components 222 collectively spoof a plurality of malware programs, whereby the method checks the system automatically for a plurality of malware programs using a plurality of malware spoof components.

In some embodiments (configured medium or otherwise), the malware spoof components 222 placed 110 include at least one component 206 extracted from a malware infection. Formed 106 components 222 may be used alone, extracted and isolated components 206 may be used alone, or both may be used as spoof components 222 in combination. In some embodiments, the malware spoof components 222 placed include at least one formed 106 component which was not extracted from a malware infection but which shares a name and at least one other system characteristic with a corresponding component of a malware infection.

It is presently expected, but not required, that embodiments using some or all of steps 102 through 126 will be primarily or exclusively designed to detect malware 204, and thus that such methods might be performed primarily or exclusively by or on behalf of people who do not benefit from the widespread installation of such malware. It is also expected but not required that some embodiments, which use at least some of steps 128 through 132 will be primarily or exclusively designed to detect malware spoof components 222 and/or other anti-malware measures, and thus that such methods might be performed primarily or exclusively by or on behalf of people who pursue and benefit from the widespread installation of such malware. Embodiments that may help malware designers are discussed herein, and claimed, not only to help provide all readers with a better understanding of the anti-malware embodiments, but also to support the possibility that malware sources might be held liable as patent infringers, regardless of any other civil or criminal penalties they face for facilitating or causing malware infections.

In particular, some embodiments include finding 128 on a target system 202, 232 a found component which has at least one characteristic that is associated with a particular malware program, and examining 130 the target system in an attempt to determine whether the found component is a malware spoof component 222. In this context, examining a found component is one example, though not the only one, of examining the target system. The context in which the component is found 128 may also be examined 130, e.g., to determine the relative position of the component in a list of system data structures 214 or on a hard disk 210, or to determine whether the system contains a signature placed by the malware on infected systems.

In some embodiments, the examining step 130 checks at least two of the following system characteristics of the found component: name, size, date, signature, relative storage location in a linked data structure, absolute storage location in a nonvolatile store, e.g., whether it is in the boot sector. In some embodiments, the examining step 130 checks at least one of the following: a signature of the found component, a timestamp of the found component, whether a copy of the found component already exists on the target system; the apparent source of the found component.

Some embodiments install 122 a malware program 204 on the target system if no malware components 206 are found 128, 130. Some embodiments install 122 a malware program 204 on the target system regardless of whether any malware components 206 are found 128, 130. Once installed, the malware 204 may be expected to behave maliciously, 132, e.g., by destroying 132 user data 216 stored on the target system.

More about Systems

With attention to both Figures, system embodiments may include data and instructions 238 in a medium 220, with equipment 210, to implement operations such as those discussed above. In some embodiments the medium 220 is removable, e.g., a CD, DVD, flash drive, or the like, configured by software 238. A given system may include a computer, a collection of communicating computers, another computing device such as a PDA or cell phone, and/or a combination of devices which have one or more processors 234 and memories 236. In many embodiments, peripheral equipment 210 such as human user I/O devices (screen, keyboard, mouse, microphone, speaker, motion sensor, etc.) will be present in operable communication with a processor 234 and memory 236. However, an embodiment may also be deeply embedded in a larger system, so that no human user interacts directly with the embodiment.

Not every item shown in FIG. 2 need be present in every system embodiment. Although the invention is illustrated in text and drawings by specific examples, other embodiments of the invention may depart from these examples. For instance, specific features of an example may be omitted, renamed, grouped differently, repeated, instantiated in hardware and/or software differently, or be a mix of features appearing in two or more of the examples.

Bearing that in mind, some system embodiments include a processor 234 in operable connection with a memory 236, in which the processor is configured by data and instructions 238 to perform the following: automatically place 110 on a target system a plurality of malware spoof components 222, without thereby infecting the target system with malware 204 that is spoofed by the malware spoof components; automatically use a utility to obtain 112 at least one listing 240 which, in the absence of filtering 132, 208 by malware, would list the placed malware spoof components; and automatically check 114 the listing(s) to determine whether the placed malware spoof components are listed therein. Thus, the target system is automatically checked for malware.

In some cases, the target system is characterized in that no trusted non-infected baseline is available for the target system. In such situations, some embodiments may be helpful in detecting malware. By contrast, some other approaches rely on comparing the listing or other output obtained using a possibly infected system with output obtained at a point when the system is known to be uninfected, e.g., output obtained using a clean operating system.

In some embodiments, the malware spoof components 222 include components of at least one of the following types: processes, other code isolation mechanisms, files, registry entries, communication port assignments, interrupt vectors, other vector table entries, hashes, other signatures, elements in a linked data structure. In some, at least one of the malware spoof components 222 is an extracted rootkit 204 component 206. In some, at least one of the malware spoof components 222 is a formed 106 component that spoofs a rootkit 204 component with respect to at least two system characteristics while differing from the rootkit component in at least one system characteristic.

Additional Scenarios

As part of a first scenario, suppose that a piece of malware 204 monitors system activity to detect installation of additional copies of malware already installed, which would detect installation of spoof components 222. If such activity is detected, the malware 204 tries to remain hidden by taking steps to distinguish the original installed malware from later-installed malware components, which are presumed by the malware designer to be spoofs 222.

For instance, the original installed malware 204 may keep a count, so that if an extra two copies of file a file named "$xyzmal.exe" are installed, then the malware filter 208 lets two copies of that file show up but hides the third (original) malware file of the same name. Alternately, if the malware 204 detects installation of a file named "$xyzmal.exe", it modifies the installed original malware by renaming the original malware file to "$abczap.exe" and the malware looks first for "$abczap.exe"; the filter 208 shows "$xyzmal.exe" but hides "$abczap.exe".

Regardless of how the malware 204 attempts to adapt if it detects installation or other placement of spoof malware component(s) 222, it may be possible to avoid detection of such placement 110 by installing an innocuously named component and then renaming it using low-level operations. For instance, a file named "hmworkl.doc" could be installed as part of placement 110, and then the pertinent part of directory structures 214 such as FAT, MFT, vnodes, etc. on disk and/or in memory could be read with one or more sector-read operations, be slightly modified to complete placement 110 by overwriting "hmworkl.doc" with "$xyzmal.exe" and then written back into memory and/or onto disk. Then the directory listing too, task manager listing, or other system utility listing 218 could be invoked, to see whether "$xyzmal.exe" is filtered 208, 132. If it is, a malware filter 208 (and hence its malware 204) is present. If it isn't filtered, the risk of a malware filter 208 being present is significantly lower. Similar approaches can be taken with registry entries, process names, and other malware components.

As part of a second scenario, assume that a piece of malware 204 monitors system activity to detect installation of additional copies of malware already installed. If such activity is detected, the malware tries to scramble 132 or delete 132 system data 214, tries to delete 132 or corrupt 132 user data 216, and/or otherwise tries to destroy 132 data on the system or to make 132 that data inaccessible for normal use. That is, the malware is designed such that if it determines that it is about to be detected, then it tries to destroy data before being detected and stopped. This clearly poses risks to people whose data the malware would harm.

But one serious problem with this approach, from a malware designer's perspective, is that it makes it necessary or at least very worthwhile to check a system for an existing installation of the malware 204 before installing the malware 204. Otherwise, many systems that could have been successfully surreptitiously infected and controlled will instead be trashed, making them useless for typical malware purposes 132 such as gathering personal data (account numbers, passwords, etc.), serving as a host for launching other infections, serving as a host for distributed denial of service or other "zombie" tasks, and so on.

However, if malware 204 takes this approach—checking for an already installed copy and installing the malware only if an installed copy is not found—then a system can be immunized 126 against that malware by placing appropriate spoof malware components 222 on the system so that the system appears to the malware 204 to be already infected, even though fully functional 132 malware of the type in question is not installed. Thus, some embodiments leave spoof malware components 222 in place 110 on a system as an immunization after using them 112, 114 to test the system for the presence of malware. Other embodiments remove 118 spoof components after placing 110 them and checking 114 the listing(s) to see if they are filtered from view. Some embodiments place spoof malware components 222 on a system as a precaution, to immunize 126 the system regardless of whether testing for malware presence on the system is also done.

CONCLUSION

Although particular embodiments of the present invention are expressly illustrated and described herein as methods or systems, it will be appreciated that discussion of one type of embodiment also generally extends to other embodiment types. For instance, the descriptions of methods in connection with FIG. 1 also help describe systems like those described in connection with FIG. 2, and vice versa. It does not follow that limitations from one embodiment are necessarily read into another.

The invention may be embodied in various ways, e.g., with processes and/or hardware on a server computer, on a client or peer, or on a standalone computer, software (data instructions) in RAM or permanent storage for performing a method, general purpose computer hardware configured by software, special-purpose computer hardware, listing reports or other data produced by a method, and so on.

Some claimed embodiments of the present invention include or facilitate placing malware on a system. This can generally be done in the art with good intent by testers of malware detection software, who place malware on systems they own or are otherwise authorized to use in such a way, and that possibility of well-intentioned infection also exists with the present invention. However, some embodiments of the invention may also be practiced with malicious intent by people who profit, receive acclaim, derive satisfaction, or otherwise benefit from the distribution of malware onto computers they have no legitimate right to place malware on. Such patent claims are not meant to encourage illegitimate (and even illegal) behavior. Rather, it is intended that patent infringement be included in the list of wrongs performed by those people, so that the legal powers of patent enforcement can be brought to bear upon them.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification and thus help describe the invention, and repeated claim language may be inserted outside the claims as needed.

While the present invention has been shown in the drawings and described above in connection with exemplary embodiments of the invention, it will be apparent to those of ordinary skill in the art that numerous modifications can be made without departing from the principles and concepts of the invention as set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment of the invention. Rather, the specific features and acts described are disclosed as examples for consideration when implementing the claims.

The scope of the invention is indicated by the appended claims rather than by the foregoing description. All changes which come within the meaning and range of equivalency of the claims are to be embraced within their scope to the full extent permitted by law.

What is claimed is:

1. A method comprising:
    placing on a system a component extracted from a malware infection, without thereby infecting the system, in that the placed component does not behave maliciously in isolation from at least one other component of the malware infection which is not on the system;
    using a utility to obtain a listing which, in the absence of filtering by malware, would list the placed malware component; and
    checking the listing to determine whether the placed malware component is listed therein.

2. The method of claim 1, wherein placing the malware component comprises placing at least one of the following: a file, a registry entry, a data structure containing a code isolation mechanism identifier, a data structure containing a malware signature.

3. The method of claim 1, further comprising the step of exposing the system to a malware program, and wherein the placed malware component serves to immunize the system from infection by the malware program.

4. The method of claim 1, further comprising the steps of: exposing the system to a malware program; and determining that the malware program searches for the placed malware component.

5. A non-transitory computer-readable storage medium configured with data and instructions for performing the following method:
    (a) automatically placing on a system a malware spoof component, without thereby infecting the system with malware that is spoofed by that malware spoof component;
    (b) automatically using a utility to obtain a listing which, in the absence of filtering by malware, would list that placed malware spoof component;
    (c) automatically checking the listing to determine whether that placed malware spoof component is listed therein; and
    (d) automatically repeating steps (a) through (c) with at least one other malware spoof component, whereby the method automatically checks the system for malware using a plurality of malware spoof components.

6. The configured medium of claim 5, wherein the placed malware spoof components collectively spoof a plurality of malware programs, whereby the method checks the system for a plurality of malware programs using a plurality of malware spoof components.

7. The configured medium of claim 5, wherein the malware spoof components placed include at least one component extracted from a malware infection.

8. The configured medium of claim 5, wherein the malware spoof components placed include at least one component which was not extracted from a malware infection but shares a name and at least one other system characteristic with a corresponding component of a malware infection.

9. The configured medium of claim 5, wherein the method further comprises the step of removing a placed malware spoof component from the system after an instance of the checking step.

10. A system, comprising:
a processor in operable connection with a memory;
the processor configured by data and instructions to perform the following:
   automatically place on a target system a plurality of malware spoof components, without thereby infecting the target system with malware that is spoofed by the malware spoof components;
   automatically use a utility to obtain at least one listing which, in the absence of filtering by malware, would list the placed malware spoof components; and
   automatically check the listing(s) to determine whether the placed malware spoof components are listed therein;
   whereby the target system is automatically checked for malware.

11. The system of claim 10, wherein the target system is characterized in that no trusted non-infected baseline is available for the target system.

12. The system of claim 10, wherein the malware spoof components comprise components of at least one of the following types: processes, other code isolation mechanisms, files, registry entries, communication port assignments, interrupt vectors, other vector table entries, hashes, other signatures, elements in a linked data structure.

13. The system of claim 10, wherein at least one of the malware spoof components is a rootkit component.

14. The system of claim 10, wherein at least one of the malware spoof components spoofs a rootkit component with respect to at least two system characteristics while differing from the rootkit component in at least one system characteristic.

15. The system of claim 10, further comprising selecting the malware spoof component to be placed from among components of a malware infection.

* * * * *